US012692722B2

(12) United States Patent
Marchand et al.

(10) Patent No.: US 12,692,722 B2
(45) Date of Patent: Jul. 28, 2026

(54) METHOD FOR MANAGING THE UNLOCKING MODE OF AN OBJECT

(71) Applicant: Orange, Issy-les-Moulineaux (FR)

(72) Inventors: Hervé Marchand, Chatillon Cedex (FR); Mathieu Rivoalen, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 181 days.

(21) Appl. No.: 18/177,425

(22) Filed: Mar. 2, 2023

(65) Prior Publication Data

US 2023/0279696 A1     Sep. 7, 2023

(30) Foreign Application Priority Data

Mar. 4, 2022    (FR) ........................................ 2201905

(51) Int. Cl.
*G08B 21/00*          (2006.01)
*E05B 47/00*          (2006.01)
*G06F 21/44*          (2013.01)

(52) U.S. Cl.
CPC .......... *E05B 47/0002* (2013.01); *G06F 21/44* (2013.01); *G06F 2221/2111* (2013.01)

(58) Field of Classification Search
CPC ................. E05B 47/0002; G06F 21/44; G06F 2221/2111
See application file for complete search history.

(56) References Cited

U.S. PATENT DOCUMENTS

| | | | | |
|---|---|---|---|---|
| 4,942,393 | A | * | 7/1990 | Waraksa ............ G07C 9/00182 |
| | | | | 340/5.72 |
| 11,026,043 | B1 | | 6/2021 | Vltavsky |
| 2014/0187200 | A1 | | 7/2014 | Reitter et al. |
| 2017/0026408 | A1 | | 1/2017 | Kaushik |

OTHER PUBLICATIONS

French Search Report and Written Opinion dated Oct. 17, 2022, for corresponding French Application No. 2201905, filed Mar. 4, 2022.

* cited by examiner

*Primary Examiner* — Mark S Rushing
(74) *Attorney, Agent, or Firm* — David D. Brush; Westman, Champlin & Koehler, P.A.

(57)          ABSTRACT

A method for managing the unlocking mode of an object. The object includes a communication interface for communicating with a device for transmitting electromagnetic signals when the object is located in the field of electromagnetic coverage formed by the signals transmitted from the device, and when the object is located in the region of coverage associated with the field of electromagnetic coverage, the method includes selecting a first unlocking mode associated with the region of coverage associated with the field of electromagnetic coverage.

8 Claims, 2 Drawing Sheets

[Fig. 1]
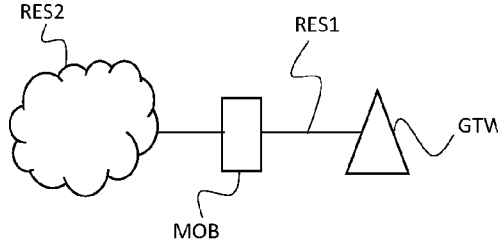
[Fig. 2]
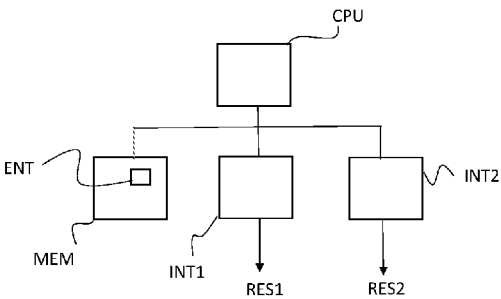
[Fig. 3]
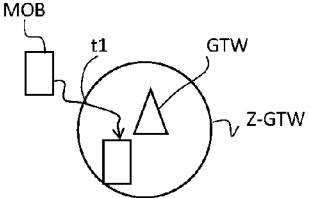
[Fig. 4]
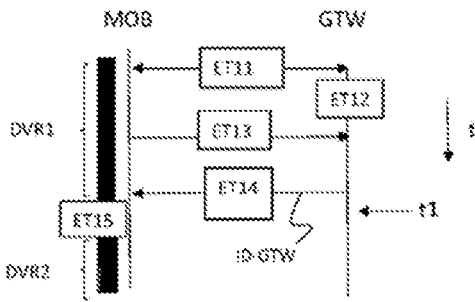

[Fig. 5]
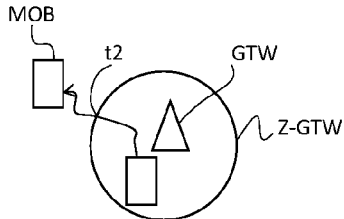
[Fig. 6]
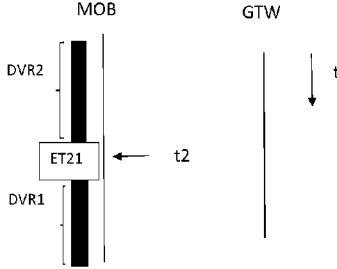
[Fig. 7]
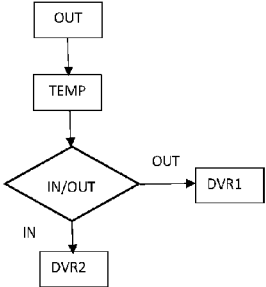
[Fig. 8]
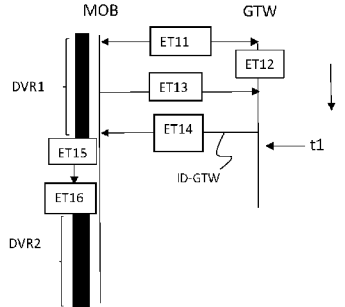

METHOD FOR MANAGING THE UNLOCKING MODE OF AN OBJECT

TECHNICAL FIELD

The field of the disclosure is that of telecommunications.

The disclosure most particularly relates to a method for managing the unlocking mode of an object used when accessing said object.

Above, the meaning of object includes both a physical object equipped with a processing unit such as a processor and a software object. A physical object is for example a mobile telephone, a tablet computer, a laptop computer, etc. A software object is for example a computer application (banking application, game, etc.).

PRIOR ART

In order to protect access to an object, the user generally defines a default unlocking mode (fingerprint, pin code, pattern, or none) chosen among a plurality of unlocking modes. The various proposed unlocking modes are associated with respective relatively high or low levels of protection against fraud.

The chosen unlocking mode may be modified manually by a user via a graphical user interface. Although modifiable, the inventors have observed that the chosen unlocking mode is rarely modified over time; in addition, they have observed that, by default, the level of protection of the chosen unlocking mode is often the highest level. However, such a level is not always judicious under all circumstances.

One or more exemplary aspects of the present disclosure aim to improve the situation.

SUMMARY

To this end, according to one functional aspect, one subject of the present disclosure is a method for managing the unlocking mode of an object, said object comprising a communication interface for communicating with a device for transmitting electromagnetic signals when the object is located in the field of electromagnetic coverage formed by the signals transmitted from the device; and when the object is located in the region of coverage associated with the field of electromagnetic coverage, the method comprises a step of selecting a first unlocking mode associated with the region of coverage associated with the field of electromagnetic coverage.

An exemplary embodiment of the present disclosure automates selection of the unlocking mode depending on whether the object is in a region of coverage of a signal transmitter or not. By virtue of an exemplary embodiment of the present disclosure, the level of protection of the unlocking mode varies over time; for example, when roaming, outside of the field of a given transmitter of signals, the unlocking mode is for example very robust, i.e. associated with a high level of protection; in contrast, near a given transmitting device, the selected protection mode will be chosen among the least secure or indeed a mode that does not require the object to be unlocked will be chosen, the object then potentially being able to be unlocked without user authentication, in the place in question.

According to a first embodiment, a correspondence between a transmitting-device identifier and an unlocking mode is stored in memory; and, when the object is in the region of coverage, the method comprises a step of receiving a transmitter identifier, the selecting step being based on the correspondence stored in memory. This first embodiment automates selection of the unlocking mode depending on a datum obtained from an identifier associated with a transmitting device, which may be a residential gateway or any other trusted device.

According to one variant of the first embodiment, the correspondence is stored in memory in the object. This variant privileges storage of the correspondence in the object; specifically, a correspondence delivered by a transmitting device, even if the latter is trusted, could have been modified by a malicious third-party having hacked the transmitting device or via a so-called man-in-the-middle technique.

According to a second embodiment, which will possibly be implemented alternatively or in addition to the preceding embodiment, the object stores a correspondence between the received identifier and a location of the transmitting device. In this configuration, the step of obtaining the identifier is followed by a step of locating the transmitting device associated with the identifier;

a step of comparing the location derived from the correspondence with the location obtained in the locating step;

the selecting step being executed depending on the result of the comparing step.

In this second embodiment, execution of the selecting step is subject to a condition; the condition being dependent on the result of the comparing step. In one example, which will be illustrated below, if the current location of the transmitting device indeed corresponds to the location derived from the recorded correspondence, in this case the selecting step is executed; in the contrary case, the selecting step is not executed and the unlocking mode is not modified. This second embodiment makes it possible, when the object receives the identifier, to make sure that the received identifier has originated from a transmitting device the location of which the device knows, and not from a device located in another location and that is therefore potentially malicious and attempting to modify the unlocking mode so as to decrease the level of protection of the unlocking mode.

According to a third embodiment, which will possibly be implemented alternatively or in addition to the preceding embodiments, when the terminal exits from the region associated with the field of coverage, the method comprises a step of selecting a second unlocking mode instead of the first unlocking mode. This mode thus automates exit from a region of coverage.

According to a variant of the third embodiment, the second unlocking mode is a default unlocking mode. This mode automates return to a default authentication mode outside of the trusted regions. The default mode will for example be chosen from modes offering a good protection in terms of security.

According to one variant of this third embodiment, the second unlocking mode is activated when the object remains out of range of the region of coverage for a given time following exit. In this way, if the exit of the device from the domestic network is only temporary, or if the electromagnetic signal, the Wi-Fi signal for example, can no longer be received because of a lack of coverage in certain regions such as a cellar, bedroom, etc., the current unlocking mode is maintained instead of being modified each time that the region of coverage is exited.

According to a first hardware aspect, an exemplary embodiment of the present disclosure relates to an entity for managing the unlocking mode of an object, said object comprising a communication interface for communicating with a device for transmitting electromagnetic signals when the object is located in the field of electromagnetic coverage formed by the signals transmitted from the device, characterized in that it comprises a processor configured to perform, when the object is located in the region of coverage associated with the field of electromagnetic coverage, a step of selecting a first unlocking mode associated with the region of coverage associated with the field of electromagnetic coverage.

According to a second hardware aspect, an exemplary embodiment of the present disclosure relates to an object characterized in that it comprises a managing entity such as defined above.

According to a third hardware aspect, an exemplary embodiment of the present disclosure relates to a computer program able to be implemented on an entity such as defined above, the program comprising code instructions that, when it is executed by a processor, carries out the steps of the method that are defined above.

Lastly, according to a fourth hardware aspect, an exemplary embodiment of the present disclosure relates to a data medium on which has been stored at least one series of program code instructions for executing a method such as defined above.

Such a storage medium may be any entity or device capable of storing the program. For example, the medium may comprise a storage means, such as a ROM, for example a CD-ROM or a microelectronic circuit ROM, or else a magnetic recording means, for example a USB key or a hard disk. Moreover, such a storage medium may be a transmissible medium such as an electrical or optical signal, which may be routed via an electrical or optical cable, by radio or by other means, such that the computer program that it contains is able to be executed remotely. The program according to an exemplary embodiment of the present disclosure may in particular be downloaded from a network, for example the Internet.

As an alternative, the storage medium may be an integrated circuit in which the program is incorporated, the circuit being configured to execute or to be used in the execution of the aforementioned method.

BRIEF DESCRIPTION OF THE DRAWINGS

Exemplary embodiments of the present disclosure will be better understood on reading the following description, which is given by way of example and with reference to the appended drawings, in which:

FIG. 1 shows a computer system with which one example of an embodiment of the disclosure is illustrated.

FIG. 2 is a simplified block diagram of the hardware structure of the object.

FIG. 3 illustrates a first embodiment in which the object enters into a region of electromagnetic coverage.

FIG. 4 illustrates message exchange between the transmitting device and the object in the configuration described with reference to FIG. 3.

FIG. 5 illustrates a second embodiment in which the object leaves the region of electromagnetic coverage.

FIG. 6 illustrates message exchange between the transmitting device and the object when the object is in the configuration described with reference to FIG. 5.

FIG. 7 illustrates a variant of the embodiment described with reference to FIG. 5.

FIG. 8 illustrates a variant of the embodiment described with reference to FIG. 3.

DETAILED DESCRIPTION OF AN EXEMPLARY EMBODIMENT OF THE DISCLOSURE

FIG. 1 shows a computer system SYS that comprises an object MOB that requires unlocking to be able to be used.

The object MOB is either a hardware device or a software package. A hardware device is a data-processing device equipped with a processor. A software package is for example a computer application installed on a data-processing device.

In our example, the object OBJ is hardware and will be illustrated by means of a mobile telephone in the examples that follow.

The system SYS further comprises a device GTW for transmitting electromagnetic signals. Transmission occurs to a given distance and forms a region of network coverage Z-GTW. In our example, the residential gateway GTW provides a region of Wi-Fi coverage referenced Z-GTW. In the figures, the region of coverage Z-GTW has been illustrated by a circle; however it will be readily understood that the region may in fact be another shape and that the latter may fluctuate over time as a result of a multitude of parameters (obstacles, interference, etc.).

In our example, the mobile object MOB is equipped with a Wi-Fi interface INT1 allowing it to communicate with the residential gateway GTW.

It will be noted that the embodiments of the present disclosure are not limited to a Wi-Fi network but on the contrary covers any type of communication means able to broadcast electromagnetic signals over a limited distance. Such communication means are for example means employing Bluetooth technology, RFID technology, etc.

In our example, the object MOB is also equipped with an interface INT2 for communicating via a mobile-communication network, a 5G telecommunication network for example.

In our example, the gateway GTW is a device trusted by the object MOB. This trust may have a number of origins; in our example, the trust is due to the fact that the object and the gateway have already been paired. Thus, when the object MOB is in the region of coverage of this gateway Z-GTW, the terminal and the reference gateway pair automatically.

The trust may have other origins. For example, in the case of a short-range network (range from a few centimeters to a few meters), such as an RFID network (RFID being the acronym of Radio Frequency IDentification), or NFC network (NFC being Near Field Communication), the proximity between the object and the RFID or NFC transmitting device is a sign of trustworthiness.

In our example, the gateway GTW is associated with an identifier Id-GTW.

The example described in the present text is based on a single transmitting device; however, embodiments of the present disclosure are applicable to an unlimited number of transmitting devices. In the latter configuration, the transmitting devices would be associated with respective identifiers.

With reference to FIG. 2, the object MOB comprises physical and software resources including a microprocessor CPU. The object MOB comprises communication interfaces, namely the first communication interface INT1 and the second communication interface INT2, and memory storage MEM that are able to store data including a program, which in our example is called the managing entity ENT, and which is able to carry out the method of an embodiment of the present disclosure described below.

The elements described above and the first microprocessor CPU are connected to one another via a bus. It will be recalled that the function of a bus is to transfer digital data between the various circuits. In our example, the bus in question includes a data bus and a control bus.

The object further comprises a plurality of possible unlocking modes. The most widely known unlocking modes are unlocking via fingerprint, via pin code, by drawing a pattern, etc.

The object may also be accessed in a mode requiring no unlocking; in this case, access to the object is simplified because no unlocking phase is required.

According to an exemplary embodiment of the present disclosure, when the object is located in the region of coverage of the signals transmitted by the transmitter, the method comprises selecting a given unlocking mode associated with the region of coverage associated with the field of electromagnetic coverage.

It will also be seen below, according to one embodiment, that when the terminal exits from the region associated with the field of coverage, the method further comprises a step of selecting a second unlocking mode instead of the first unlocking mode.

In our example of embodiment, when the object OBJ is located in the field of coverage Z-GTW, the object MOB receives, from the gateway GTW, an identifier ID-GTW. After reception of the identifier, the object OBJ selects an unlocking mode depending on the received identifier. It will be understood here that the unlocking mode varies automatically, contrary to the prior art.

In our example, a correspondence between transmitting-device identifiers and respective unlocking modes is stored in a database BDD, which is preferably located in the memory of the object MOB.

The correspondence between transmitting-device identifiers and respective unlocking modes could also, according to one variant, be transmitted by the transmitting device. However, storage of the correspondence in the object is preferred in terms of protection; specifically, storing the correspondence in a transmitting device, even though trusted, might lead to hacking of the transmitting device; the correspondence could then be modified in such a way as to decrease the level of protection of the unlocking mode. A malicious third-party would consequently increase his chances of unlocking the object.

FIGS. 3 and 4 illustrate a first embodiment. In this first embodiment, the object OBJ is initially located outside of the region of coverage Z-GTW. At this stage, a first unlocking mode DVR1 is used. In our example, the first unlocking mode outside of the region Z-GTW is a default unlocking mode; this mode is for example a mode associated with a high level of protection, for example one using a fingerprint.

FIG. 4 is a schematic view of the message exchanges between the object MOB and the gateway GTW in the first embodiment described with reference to FIG. 3.

The object OBJ is considered to be moving at a given time, and then enters the region Z-GTW at the time t1.

At this stage, in a step ET11, the object MOB requests a Wi-Fi connection to be set up.

In a second step ET12, the gateway GTW receives the request and thus detects entry of the object OBJ into the region of coverage Z-GTW.

Detection could be achieved in a way other than reception of a connection-setup request, for example by means of a camera or other similar detector capable of detecting entry of the object into the region.

Following setup, in a step ET13, the object OBJ transmits a DHCP request. It will be recalled that DHCP (acronym of Dynamic Host Configuration Protocol) is a protocol that allows a computer, in our case the object, connecting to a network to dynamically obtain a network configuration.

The gateway GTW identifies the object OBJ and pairs with the object.

It will be noted here that the embodiment may be implemented without pairing, in particular when the transmitting device does not require pairing.

Following pairing, in our example, in a step ET14, the gateway GTW transmits a gateway identifier Id-GTW to the object OBJ. In our example, the gateway identifier Id-GTW is transmitted in a DHCP reply.

Following reception of the identifier Id-GTW, the object MOB retrieves, in a step ET15, the unlocking mode DVR2, referred to as the second unlocking mode, by virtue of the database BDD of correspondences storing the correspondences between identifiers and unlocking modes.

Following obtainment of the second unlocking mode DVR2, assuming that the current mode, namely the first mode DVR1, is an unlocking mode other than the mode derived from the correspondence, the object replaces the current mode DVR1 with the unlocking mode DVR2 derived from the correspondence.

In the preceding example, the database BDD of correspondences is stored in the memory of the object OBJ. According to one variant, the database may be stored in the memory of the gateway or in a memory external to the gateway to which the gateway or the object has access.

FIGS. 5 and 6 illustrate a second embodiment, which may possibly follow on from the first embodiment. It is now assumed that the object is leaving the region of coverage Z-GTW, at a time t2.

FIG. 6 is a schematic view of the steps implemented in the object in the second embodiment described with reference to FIG. 5.

The object OBJ detects it has exited when it is no longer in the region of coverage Z-GTW.

Following exit, the object OBJ automatically modifies, in a step ET21, the current unlocking mode, namely the second unlocking mode DVR2, and replaces it with a default unlocking mode, in our example the first unlocking mode DVR1.

The two embodiments described above have variants.

According to one variant of the second embodiment, with reference to FIG. 7, following exit, the unlocking mode is changed only if it is confirmed that the object is outside of the region Z-GTW, after a given time TEMP following exit OUT from the region Z-GTW.

According to this variant, following exit OUT at the time t2 introduced above, a delay time TEMP is waited, at the end of which it is verified whether the object is still out of range of the region of coverage Z-GTW at the end of the delay time.

If so, the unlocking mode is modified from the current second mode DVR2 to the first mode DVR1. If not, the current second unlocking mode DVR2 is kept.

Furthermore, advantageously, before deciding whether to keep the current mode, an additional verification may consist in verifying whether the object was out of range for the entire delay time TEMP.

This variant avoids executing the steps described above when the object is located on the edge of the region and the object has unwittingly disconnected for a few seconds by exiting the region of coverage and subsequently reconnecting. This variant is useful when the object is located on the edge of the region of coverage.

According to a second variant connected with the first embodiment described above, with reference to FIG. 8, the object OBJ further stores a correspondence between the received identifier and a location of the transmitting device associated with the identifier.

In this second variant, steps Eli to ET15 are the same as those described with reference to FIG. 4.

Most of the time, the location of the transmitting device is a fixed position; nevertheless, this variant also covers the case where the location of the transmitting device varies over time; in this case, the object regularly receives an update of the location of the transmitting device, preferably from a trusted device. In this configuration, following obtainment of the identifier by the object OBJ, in a step ET16, the object OBJ, by which is meant the managing entity ENT, requests a location of the transmitting device, which may be a mobile gateway implemented in a mobile terminal. This mode is known as tethering to the skilled person.

More precisely, with reference to FIG. 8, following reception of the identifier of the gateway, in particular in our example, following the fifth step ET15, the object carries out the following succession of steps ET16, a. a step of locating the transmitting device associated with the identifier;

b. a step of comparing the location derived from the correspondence with the location obtained in the locating step;

the selecting step being executed depending on the result of the comparing step.

In this second variant, execution of the selecting step is subject to a condition; the condition being dependent on the result of the comparing step. If the current location of the transmitting device indeed corresponds to the location derived from the recorded correspondence, in this case the selecting step is executed; in the contrary case, the selecting step is not executed and the unlocking mode is not modified. This second embodiment makes it possible, when the object receives the identifier, to make sure that the received identifier has originated from a transmitting device the location of which the device knows, and not from a device located in another location and that is therefore potentially malicious and attempting to modify the unlocking mode so as to decrease the level of protection of the unlocking mode.

It will be noted here that, in the present text, steps carried out by the object are understood to be steps carried out by the managing entity ENT.

It will lastly be noted here that the term module or the term entity may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.)

Although the present disclosure has been described with reference to one or more examples, workers skilled in the art will recognize that changes may be made in form and detail without departing from the scope of the disclosure and/or the appended claims.

The invention claimed is:

1. A method comprising:

managing an unlocking mode of an object by a management entity, said object comprising a communication interface for communicating with a transmitting device for transmitting electromagnetic signals when the object is located in the field of electromagnetic coverage formed by the signals transmitted from the transmitting device, the managing comprising:

in response to the object being located in the region of coverage associated with the field of electromagnetic coverage, selecting a first unlocking mode associated with the region of coverage associated with the field of electromagnetic coverage;

detecting that the object exited the region associated with the field of coverage;

waiting a delay time following the detection of the exit; and activating a second unlocking mode instead of the first unlocking mode after verifying at an end of the delay time that the object remains out of range of the region of coverage following the detection of the exit.

2. The method according to claim 1, wherein a correspondence between a transmitting-device identifier of the transmitting device and the unlocking mode is stored in memory; and the method comprises, when the object is in the region of coverage, receiving the transmitting-device identifier, the selecting of the first unlocking mode being based on the correspondence stored in memory.

3. The method according to claim 2, wherein the object stores a correspondence between the received transmitting-device identifier and a location of the transmitting device associated with the identifier and the obtaining the identifier is followed by acts of:

a. locating the transmitting device associated with the identifier;

b. comparing the location derived from the correspondence with the location obtained in the locating act;

the selecting of the first unlocking mode being executed depending on a result of the comparing act.

4. The method according to claim 1, wherein the second unlocking mode is a default unlocking mode.

5. An entity for managing an unlocking mode of an object, said object comprising a communication interface for communicating with a transmitting device for transmitting electromagnetic signals when the object is located in the field of electromagnetic coverage formed by the signals transmitted from the transmitting device, wherein the entity comprises:

a processor configured to:

in response to the object being located in the region of coverage associated with the field of electromagnetic coverage, select a first unlocking mode associated with the region of coverage associated with the field of electromagnetic coverage;

detect that the object exited the region associated with the field of coverage;

wait a delay time following the detection of the exit; and activate a second unlocking mode instead of the first unlocking mode after verifying at an end of the delay time that the object remains out of range of the region of coverage following the detection of the exit.

6. An object comprising the entity defined in claim 5.

7. A non-transitory computer readable data medium on which has been stored at least one series of program code instructions for executing a method for managing an unlocking mode of an object when the instructions are executed by a processor of a managing entity, said object comprising a communication interface for communicating with a transmitting device for transmitting electromagnetic signals 5 when the object is located in the field of electromagnetic coverage formed by the signals transmitted from the transmitting device, and wherein the method comprises:

in response to the object being located in the region of coverage associated with the field of electromagnetic 10 coverage, selecting a first unlocking mode associated with the region of coverage associated with the field of electromagnetic coverage detecting that the object exited the region associated with the field of coverage; 15 waiting a delay time following the detection of the exit; and activating a second unlocking mode instead of the first unlocking mode after verifying at an end of the delay time that the object remains out of range of the region 20 of coverage following the detection of the exit.

8. The method according to claim 1, wherein the verifying comprises:

verifying whether the object was located outside the field of coverage for the entire delay time. 25

* * * * *